(12) United States Patent
Dunjic et al.

(10) Patent No.: US 12,131,361 B2
(45) Date of Patent: Oct. 29, 2024

(54) DISTRIBUTED AUTHENTICATION AT A PHYSICAL PREMISES

(71) Applicant: The Toronto-Dominion Bank, Toronto (CA)

(72) Inventors: Milos Dunjic, Oakville (CA); David Samuel Tax, Toronto (CA); Kushank Rastogi, Toronto (CA); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 59 days.

(21) Appl. No.: 17/824,165

(22) Filed: May 25, 2022

(65) Prior Publication Data

US 2023/0385890 A1    Nov. 30, 2023

(51) Int. Cl.
*G06Q 30/06* (2023.01)
*G06Q 30/0601* (2023.01)
*G06Q 50/26* (2024.01)

(52) U.S. Cl.
CPC ....... *G06Q 30/0609* (2013.01); *G06Q 50/265* (2013.01)

(58) Field of Classification Search
None
See application file for complete search history.

(56) References Cited

U.S. PATENT DOCUMENTS

| 9,143,506 B2 * | 9/2015 | Duncan .................. G06F 21/32 |
| 9,904,921 B2 * | 2/2018 | Ghosh .............. G06Q 20/40145 |
| 9,928,435 B2 * | 3/2018 | El-Khamy ........... G06V 20/593 |
| 10,157,413 B2 * | 12/2018 | Landers, Jr. ........... G06V 20/80 |
| 10,373,165 B2 | 8/2019 | Gabriele et al. |

(Continued)

OTHER PUBLICATIONS

Anon., "VTB and Rostelecom to provide access to VTB Arena using biometrics," Russia Business News, Athena Information Solutions Pvt. Ltd. (Jan. 27, 2021). (Year: 2021).*

(Continued)

*Primary Examiner* — Nicholas D Rosen
(74) *Attorney, Agent, or Firm* — Rowand LLP

(57) ABSTRACT

According to an aspect there is provided an ambient commerce system. The ambient commerce system may include a sensor at an ambient commerce premises, a communication module, and a processor coupled to the sensor and the communication module. The ambient commerce system further includes a memory coupled to the processor. The memory stores processor-executable instructions which, when executed, cause the processor to: detect, based on an output of one or more of the sensors, an unauthenticated entity at an ambient commerce premises; receive, from a first independent trusted system and via the communication module, an indication that authentication has been performed by the first independent trusted system for the unauthenticated entity using a first authentication parameter; determine that the entity is an authenticated entity based on the indication that the authentication has been performed and at least a second authentication parameter; and perform an ambient commerce operation for the authenticated entity.

19 Claims, 6 Drawing Sheets

(56) References Cited

U.S. PATENT DOCUMENTS

| | | | |
|---|---|---|---|
| 10,387,980 B1* | 8/2019 | Shahidzadeh | G06Q 40/123 |
| 10,846,699 B2 | 11/2020 | Sheets et al. | |
| 10,972,457 B2 | 4/2021 | Zucker et al. | |
| 11,030,640 B2 | 6/2021 | Setchell et al. | |
| 11,100,485 B2 | 8/2021 | Wyper et al. | |
| 11,113,939 B1* | 9/2021 | Gruber | G08B 13/1966 |
| 11,556,888 B2* | 1/2023 | Perez | H04W 4/35 |
| 2003/0028494 A1* | 2/2003 | King | H04N 21/2541 |
| | | | 705/71 |
| 2014/0089672 A1 | 3/2014 | Luna et al. | |
| 2014/0230032 A1* | 8/2014 | Duncan | H04L 63/0861 |
| | | | 726/7 |
| 2015/0120547 A1* | 4/2015 | Ghosh | G06Q 20/4012 |
| | | | 705/44 |
| 2016/0171566 A1* | 6/2016 | Pugh | G06Q 30/0281 |
| | | | 705/346 |
| 2017/0012972 A1* | 1/2017 | Tanaka | G06F 1/1698 |
| 2017/0193315 A1* | 7/2017 | El-Khamy | G08G 1/0175 |
| 2017/0243225 A1* | 8/2017 | Kohli | G06Q 20/40145 |
| 2018/0349939 A1* | 12/2018 | Setchell | G06V 20/52 |
| 2019/0050865 A1* | 2/2019 | Sheets | G06F 21/83 |
| 2019/0095925 A1* | 3/2019 | Gabriele | G06Q 20/3226 |
| 2019/0095940 A1 | 3/2019 | Licht | |
| 2020/0137047 A1* | 4/2020 | Zucker | H04W 4/35 |
| 2020/0175516 A1 | 6/2020 | Trim et al. | |
| 2020/0210951 A1* | 7/2020 | Perez | H04L 63/0861 |
| 2020/0302417 A1* | 9/2020 | Wyper | G06Q 30/04 |
| 2022/0164909 A1* | 5/2022 | McDaniel | G06Q 20/0855 |

OTHER PUBLICATIONS

Siegfried, R., "The future of supermarkets is IP-based security solutions enable advanced shopping," https://www.axis.com/blog/secure-insights/autonomous-shops/, Jun. 3, 2021. (Year: 2021).*

Nanou: "How Amazon's Cashierless Grocery Stores Actually Work", https://www.makeuseof.com/how-amazons-cashierless-grocery-stores-actually-work/, publication date Aug. 7, 2021.

* cited by examiner

DISTRIBUTED AUTHENTICATION AT A PHYSICAL PREMISES

TECHNICAL FIELD

The present application relates to ambient commerce systems and, more particularly, to systems and computer-implemented methods for authenticating an entity in an ambient commerce session.

BACKGROUND

Ambient commerce systems are sometimes deployed at an ambient commerce premises such as a store to allow customers to skip a traditional checkout process. Often, a customer will tap a credit card or app at a reader when they enter a store and the ambient commerce system monitors which items the customer leaves the store with and then automatically processes a payment for such items. Ambient commerce systems offer a cashier-less checkout experience. In this way, a customer does not have to participate in a traditional checkout process—they simply walk out of the store with any items that are to be purchased.

Ambient commerce systems offer numerous benefits including, for example, reducing the possibility of theft, increasing the speed of checkout, and reducing human resource requirements. However, ambient commerce systems present some challenges. One such challenge involves authentication of an entity. For example, in order to allow the customer to use ambient commerce, the customer must first somehow be identified. To allow for a true ambient experience, the authentication of an entity should be performed to minimize customer interaction. For example, a true ambient commerce experience may authenticate the entity as a background process without informing the entity that they are being authenticated.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
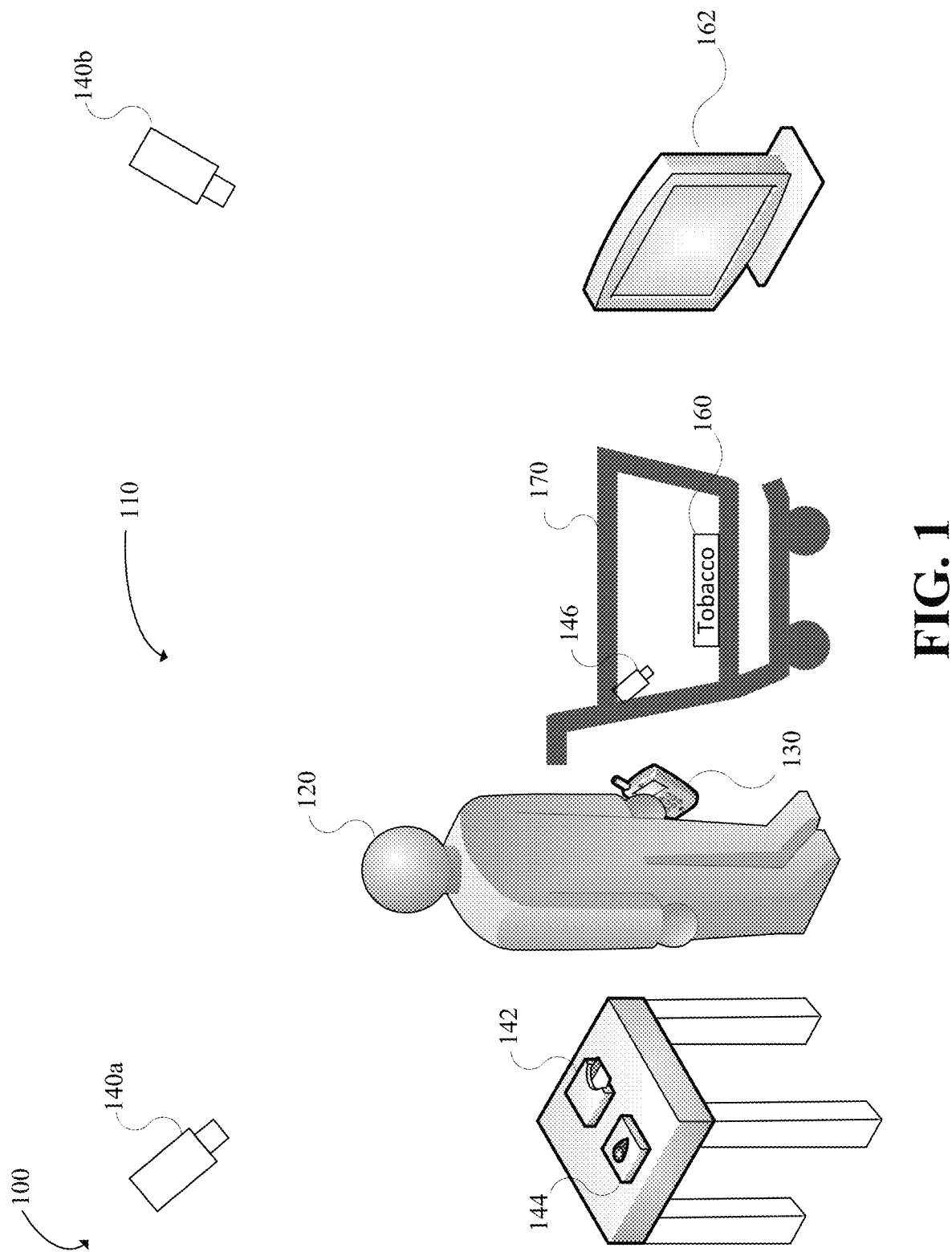
FIG. 1 is a plan view of an ambient commerce system at an ambient commerce premises illustrating an operating environment of an example embodiment.

According to an aspect there is provided an ambient commerce system. The ambient commerce system may include a sensor at an ambient commerce premises and a communication module and a processor coupled to the sensor and the communication module. The ambient commerce system may also include a memory coupled to the processor. The memory may store processor-executable instructions which, when executed, cause the processor to: detect, based on an output of one or more of the sensors, an unauthenticated entity at an ambient commerce premises; receive, from a first independent trusted system and via the communication module, an indication that authentication has been performed by the first independent trusted system for the unauthenticated entity using a first authentication parameter; determine that the entity is an authenticated entity based on the indication that the authentication has been performed and at least a second authentication parameter; and perform an ambient commerce operation for the authenticated entity.

Conveniently, in this way, authentication may be performed in an ambient commerce session in a distributed manner. This may allow authentication even in deployments in which various parts of the system are provided by or operated by various entities. For example, in one implementation, this may allow payment systems and on-premises sensor systems to be operated by different entities and yet still allow both such systems to play a role in the authentication of an entity. Conveniently, this may allow for payment and sensing systems to be provided separately such that a sensing system may be compatible with multiple payment systems. Additionally or alternatively, by using multiple distinct systems to assist with authentication, the authentication may be made more robust and less prone to fraud or failure. For example, even where one of the systems is compromised, the other of the systems may not be compromised. For example, in some implementations, one of the systems may be a financial institution system that is protected with bank-grade security and such a system may be less likely to be compromised than the other system which may be protected by security protocols that are not bank-grade.

In another aspect, there is described a computer-implemented method. The method may include: detecting, based on an output of one or more sensors, an unauthenticated entity at an ambient commerce premises; receiving, from a first independent trusted system, an indication that authentication has been performed by the first independent trusted system for the unauthenticated entity using a first authentication parameter; determining that the entity is an authenticated entity based on the indication that the authentication has been performed and at least a second authentication parameter; and performing an ambient commerce operation for the authenticated entity.

In some implementations, the processor-executable instructions further cause the processor to receive, from a second independent trusted system and via the communication module, an indication that authentication has been performed for the unauthenticated entity by the second independent trusted system using the second authentication parameter. The determination that the unauthenticated entity is an authenticated entity is based on the indication that authentication has been performed for the unauthenticated entity by the second independent trusted system using the second authentication parameter.

In some implementations, one or both of the first and second independent trusted systems may be separate and remote from the ambient commerce system.

In some implementations, determining that the unauthenticated entity is an authenticated entity may include determining that the authentication has been performed based on at least a threshold of authentication parameters.

In some implementations, the first and second authentication parameters may include one or more of: a facial profile, a voiceprint, a fingerprint, a credential, a location, and a behavioural indication.

In some implementations, the second authentication parameter may be determined based on a sensor output of the sensor.

In some implementations, the first independent trusted system may be a financial institution system.

In some implementations, the indication may include stored profile data and determining that the unauthenticated entity is an authenticated entity based on the indication that the authentication has been performed and at least a second authentication parameter may include comparing data obtained from the sensor to the stored profile data.

In some implementations, the stored profile data may include one or more of: a facial profile, a fingerprint, a credential, a voiceprint, and a behavioural indication.

In some implementations, the indication may indicate that a particular entity has been identified as being at the ambient commerce premises.

In some implementations, the instructions may further configure the processor to determine that a particular entity may be at the ambient commerce premises based on the second authentication parameter and, in response to determining that the particular entity may be at the ambient commerce premises, send, to the first independent trusted system, a request for the indication.

In some implementations, the indication is formatted to uniquely identify the first independent trusted system as the source of the indication.

In some implementations, the indication is formatted to uniquely identify the first independent trusted system using a private key associated with the first independent trusted system and wherein the instructions further configure the processor to decrypt the indication with a public key associated with the private key.

In another aspect, there is provided a computer-readable storage medium. The computer-readable storage medium may be a non-transitory computer-readable storage medium. The computer-readable storage medium may have stored thereon instructions which, when executed, configure a processor and/or a computer system to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

Systems and methods for providing identity data to remote computer systems using a payment network are described below.

FIG. 1 is a plan view of an ambient commerce system 100 at an ambient commerce premises 110. The ambient commerce premises 110 may be a merchant location such as a store. The store may be a bricks-and-mortar establishment at which a customer may physically attend to shop. By way of example, the store may be or include any one or more of a grocery store, a department store, a clothing store, a thrift shop, a sporting goods store, a big box store, a pet store, a discount store, a warehouse store, a convenience store, or a store of another type.

The ambient commerce system 100 may be referred to as a cashier-less checkout system, an ambient checkout system, a "just-walk-out" system or "grab and go" system. The ambient commerce system 100 includes one or more sensors which are used by the ambient commerce system to identify one or more items 160, 162 that are sold at the ambient commerce premises 110 and that are being purchased by an entity 120 such as a customer who is on site at the ambient commerce premises 110.

The items may be or include any products. By way of example, the items 160, 162 that are available for purchase via the ambient commerce system 100 may be or include groceries, electronic goods, sporting goods, accessories, clothing, or goods of another type. One or more of the items may be a restricted item, such as an age-restricted item. By way of example, the age-restricted item may be a tobacco item such as cigarettes or chewing tobacco, a lottery item such as a lottery ticket, 50/50 ticket or scratch ticket, an alcohol product such as beer, wine or spirits, or a *cannabis* product such as a smokeable *cannabis* product, edible *cannabis* product, or an oil.

Restricted products may also be or include other types of restricted products. For example, any product that is not available to all customers may be a restricted product (which may also be referred to herein as a restricted item) for the purpose of this document. In some implementations, a restricted product may be a product that is a limited quantity product and which a merchant has elected to restrict the sale to only customers satisfying defined criteria.

The ambient commerce system 100 may include various sensors. One or more of the sensors may be on site at the ambient commerce premises 110. The sensors may generate respective sensor outputs which are used by the ambient commerce system 100 to facilitate ambient commerce. For example, the sensors may be or include one or more cameras 140a, 140b. The cameras may be located at various regions throughout the ambient commerce premises 110. In some implementations, the cameras 140a, 140b are part of a camera array or camera grid. The camera array or grid may provide complete or near complete coverage of all areas of the ambient commerce system 100 and the cameras may be configured to provide some overlap in camera coverage. In some implementations, each of the cameras may include multiple image sensors or the cameras may be configured in multiples such as pairs to enable the ambient commerce system 100 to determine and evaluate depth information as part of its analysis.

The sensors may include a receptacle contents detector 146. The receptacle contents detector 146 may be provided on or associated with a particular shopping receptacle 170. The particular shopping receptacle 170 is a container or other receptacle which may be used for holding or transporting goods while shopping. The particular shopping receptacle may, for example, be a shopping cart, shopping basket, shopping bag, or shopping bin.

The receptacle contents detectors 146 may be or include any one or more of: a camera, a barcode reader, a quick response (QR) code reader, a wireless tag reader such as a radio frequency identifier (RFID) reader or a sensor of another type.

In some implementations, one or more of the items that may be available for purchase may include a physical feature which facilitates identification of that item by one of the sensors. By way of example, the items may include a barcode which may be scanned by a barcode reader or camera, a QR code which may be scanned by a QR code reader or scanner, and/or a wireless tag such as an RFID tag.

The sensors included in the ambient commerce system 100 may include other types of sensors and readers including, for example, a biometric reader 144 and/or a token reader 142. The biometric reader 144 and/or the token reader 142 may be identity sensors. Identity sensors are sensors that are used to verify the identity of an entity 120. That is, identity sensors may be used to associate an entity 120 on the ambient commerce premises 110 with a profile or account.

The biometric reader 144 may be or include a fingerprint sensor, a facial recognition sensor, a retina scanner, or a sensor of another type. The token reader 142 may be a physical card reader such as a payment card reader including a credit card reader or debit card reader. In some implementations, the token reader 142 may be or include a near field communication (NFC) reader. The token reader 142 may be configured, in some implementations, to wirelessly read a token which may be stored on an electronic device 130 associated with an entity 120 or which may be stored on a physical card.

The sensors included in the ambient commerce system 100 may also include a microphone. The microphone may be used, for example, to verify the identity of an entity using a voiceprint. That is, the microphone may be used as an identity sensor.

The sensors included in the ambient commerce system 100 may be or include a gaze detection sensor. The gaze detection sensor may be or include one or more cameras. The gaze detection sensor may be an eye gaze detection sensor. The gaze detection sensor may be used to identify at item that the entity 120 is currently looking at. The gaze detection sensor may detect where the entity 120 is looking by identifying a portion of an ambient commerce premises 110 being looked at from an angular direction of a head and/or eyes. In some implementations, the gaze detection sensor may be configured to identify a gaze vector and an item may be identified if it is in a direction associated with the gaze vector.

The ambient commerce system 100 may be configured to detect the identity of an entity 120 and/or items 160, 162 that are being purchased using any one of a number of techniques. Accordingly, the ambient commerce system 100 may be configured to authenticate an entity 120. Authentication, as used herein, means identifying the entity. More specifically, such identification may be performed by mapping the entity to an entity account.

In at least one implementation, the ambient commerce system 100 is in communication with one or more other systems which may be used to assist with authentication of an entity. By way of example, the ambient commerce system 100 may be in communication with a first independent trusted system. The first independent trusted system may be a resource server. For example, the first independent trusted system may be a financial institution system.

The first independent trusted system may provide, to the ambient commerce system 100, an indication that authentication has been performed by the first independent trusted system for an unauthenticated entity based on a first authentication parameter. The first authentication parameter may be of a variety of types. By way of example, it may be that the ambient commerce system 100 determines that a particular entity is at a location that is associated with an ambient commerce premises. This may be determined, for example, using a location subsystem on an electronic device 130 associated with the entity. The location subsystem may be or include a Global Positioning System (GPS) and/or a cellular triangulation system. The location subsystem may be accessed using an application stored on the electronic device 130. The application may be, for example, an application that is associated with the first independent trusted system. By way of example, the application may be a mobile banking application installed on the electronic device 130. The first independent trusted system may recognize that the electronic device 130 has entered into a geofence associated with the ambient commerce premises and it may then initiate communications with the ambient commerce system. For example, when the electronic device 130 enters the geofence, the first independent trusted system may recognize it has entered the geofence and it may then provide the ambient commerce system associated with that ambient commerce premises an indication. The indication may indicate that authentication of the entity has been performed based on a first authentication parameter. In some instances, the indication may indicate that a particular entity has been identified as being at the ambient commerce premises. In some instances, the indication may indication that an authentication of another type has been performed instead of or in addition to authentication of location. For example, the indication may indicate that identity of a customer has been verified by the first independent trusted system. Such verification may be performed based on a biometric, such as a fingerprint, voiceprint or faceprint, or it may be performed based on input of a credential, such as a PIN or password.

The indication may indicate an identity of the entity. For example, the indication may indicate the identity of the customer using an identifier associated with the entity. The identifier may be or include a name. In at least some implementations, the identifier may be or include a unique identifier such as a unique account identifier. By way of example, the indication may include an account number.

The ambient commerce system 100 may receive the indication and use the indication to authenticate the entity. In this way, the ambient commerce system 100 authenticates the entity indirectly based on the first authentication parameter. The ambient commerce system may also authenticate the entity, either directly or indirectly, based on one or more other parameters. By way of example, authentication may be performed based on a second authentication parameter. The second authentication parameter may be or include any one or more of: a facial profile, a voiceprint, a credential, a location, and a behavioural indication. In some implementations, the ambient commerce system 100 may perform authentication based on the second parameter directly. By way of example, one or more sensors associated with the ambient commerce system, such as the identity sensors, may be used by the ambient commerce system 100 to further identify and/or authenticate the entity. For example, it may be that the indication received from the first independent trusted system may include data, such as a facial profile, fingerprint or voiceprint, which may be used by the ambient commerce system to further identify and/or authenticate the entity. For example, the facial profile, fingerprint or voiceprint may be compared to a sensor output of the identity sensor(s).

In other examples, the ambient commerce system may perform identification and/or authentication indirectly. For example, the ambient commerce system may rely upon only independent trusted systems to perform the identification/authentication. For example, it may be that the ambient commerce system is in communication with a first independent trusted system and a second independent trusted system and those independent trusted systems may authenticate the entity as being on site at the ambient commerce premises. Such authentication may be performed based on sensor data from one or more of the identity sensors at the ambient commerce premises. For example, the sensors may be connected to the independent trusted system either directly or through the ambient commerce system. The independent trusted system may then perform authentication based on the sensor output. In other implementations, the independent trusted system may perform authentication based on other data. For example, the independent trusted system may communicate with an electronic device associated with an entity to confirm that the electronic device is on site at the ambient commerce premises and/or to verify the identity of a current user of the electronic device that is on site at the ambient commerce premises.

Accordingly, in some implementations, identity may be detected, in whole or in part, using an identity sensor. For example, the biometric reader 144 and/or token reader 142 and/or one or more of the cameras 140*a*, 140*b* may be used to determine identity of an entity when the entity enters the ambient commerce premises 110. By way of example, in some implementations, upon entering the ambient commerce premises, the entity 120 may tap their electronic device at a token reader 142 which may then read a token from the electronic device which uniquely identifies the customer. In some implementations, multiple authentication techniques may be used to verify the identity of the customer. For example, the ambient commerce system may use two or more of: facial recognition; token acquisition and verification; retinal scanning; fingerprint scanning; and voiceprint scanning. As noted above, at least some of the authentication techniques may be performed by one or more independent trusted systems. The independent trusted systems may be third party systems that are separately operated from the ambient commerce system.

Further, in some implementations, identity of an entity 120 may be determined or verified using a shared secret such as a personal identification number (PIN) or secret code or phrase. The ambient commerce system 100 and/or an independent trusted system may include an input device for receiving input of the shared secret from an entity 120.

In some implementations, the ambient commerce system 100 and/or an independent trusted system may include or operate in cooperation with an electronic device 130 associated with an entity 120. The electronic device 130 may be a portable electronic device such as a smartphone, smartwatch or other wearable electronic device. The electronic device 130 may, in some implementations connect with the ambient commerce system 100 and/or the independent trusted system when it is within a geolocation or geofence associated with the ambient commerce system 100. For example, when the electronic device 130 is at the ambient commerce premises, it may connect with the ambient commerce system 100 and/or the independent trusted system. Such communication may be performed via a long or short range communication protocol. In some implementations, the electronic device 130 may have an ambient commerce application stored thereon which is configured to enable the electronic device 130 to communicate with the ambient commerce system 100. In some implementations, the electronic device 130 may have an independent trusted system application stored thereon such as, for example, a banking application, which is configured to enable the electronic device 130 to communicate with the independent trusted system.

In at least some implementations, the electronic device 130 may be used to identity an entity 120. For example, the electronic device 130 may share its location (as determined from a location subsystem such as a GPS subsystem) with the ambient commerce system 100 and/or the independent trusted system. The ambient commerce system 100 and/or the independent trusted system may determine that a particular entity 120 is on site at the ambient commerce premises when the location of that entity's electronic device is within a geofence defined for the ambient commerce premises. Additionally or alternatively, in some implementations the electronic device 130 may connect to the ambient commerce system 100 and/or the independent trusted system via a short range communication protocol such as NFC, Bluetooth™, WiFi, or a short range communication protocol of another type. In such implementations, the ambient commerce system may determine that a particular entity 120 is on site at the ambient commerce premises when the location of that entity's electronic device is in communication range of a short-range communication system associated with the ambient commerce premises.

In some implementations, the ambient commerce system 100 and/or the independent trusted system may use a biometric sensor associated with an entity's electronic device to further verify that a particular entity 120 is at the ambient commerce premises. For example, the ambient commerce system and/or the independent trusted system may, when the electronic device is determined to be on site, cause the electronic device to prompt the entity for input of a shared secret or a biometric such as a fingerprint. In this way, the ambient commerce system and/or the independent trusted system determines that the electronic device is on site and is being used by a particular entity 120. This may, for example, prevent a fraudster from circumventing the ambient commerce system by stealing another person's electronic device.

The electronic device 130 associated with an entity 120 may be used for other purposes instead of or in addition to identification and customer detection. For example, the electronic device 130 may include an output interface such as a display screen or speaker and the output interface may be used for outputting notifications generated by the ambient commerce system or by another system associated with the ambient commerce system.

In some implementations, the ambient commerce system 100 may perform a computer operation in response to detecting engagement of the entity with a restricted item. For example, the ambient commerce system 100 may output a notification on an electronic device 130 associated with an entity or may output notifications on an electronic device associated with an in-store representative. In some implementations, the ambient commerce system 100 may control an electrically controlled exit prevention device such as an electrically controlled gate associated with an exit for the ambient commerce premises as a direct result of the determination that the entity is engaged with a restricted item. The electrically controlled gate may be, for example, an electrically controlled turnstile. In some implementations, the computer operation that is performed in response to detecting engagement of the entity with a restricted item may be selectively performed based on an identity of the entity. For example, if the entity is permitted to obtain the restricted item based on the identity of the entity, the computer operation may not be performed but if the entity is not permitted to obtain the restricted item based on the identity of the entity, then the computer operation may be performed. For example, where the restricted item is age-restricted, the ambient commerce system 100 may only permit the item to be purchased if the identified entity is sufficiently old.

Engagement may be detected based on the output of one or more of the sensors. By way of example, engagement may be detected when the ambient commerce system determines, based on the output of a sensor such as a camera 140a, 140b, that an entity has dwelled within a geofence associated with a first item. By way of further example, engagement with an item may be detected when the ambient commerce system determines, based on the output of a sensor such as a receptacle contents detector 146, that the item has been added to a shopping receptacle. By way of further example, engagement with an item may be detected based on gaze. For example, when the ambient commerce system determines that the entity is looking at the item, which may be determined from the output of a gaze detection sensor, it may determine that the customer is engaged with the item.

Figure 2:
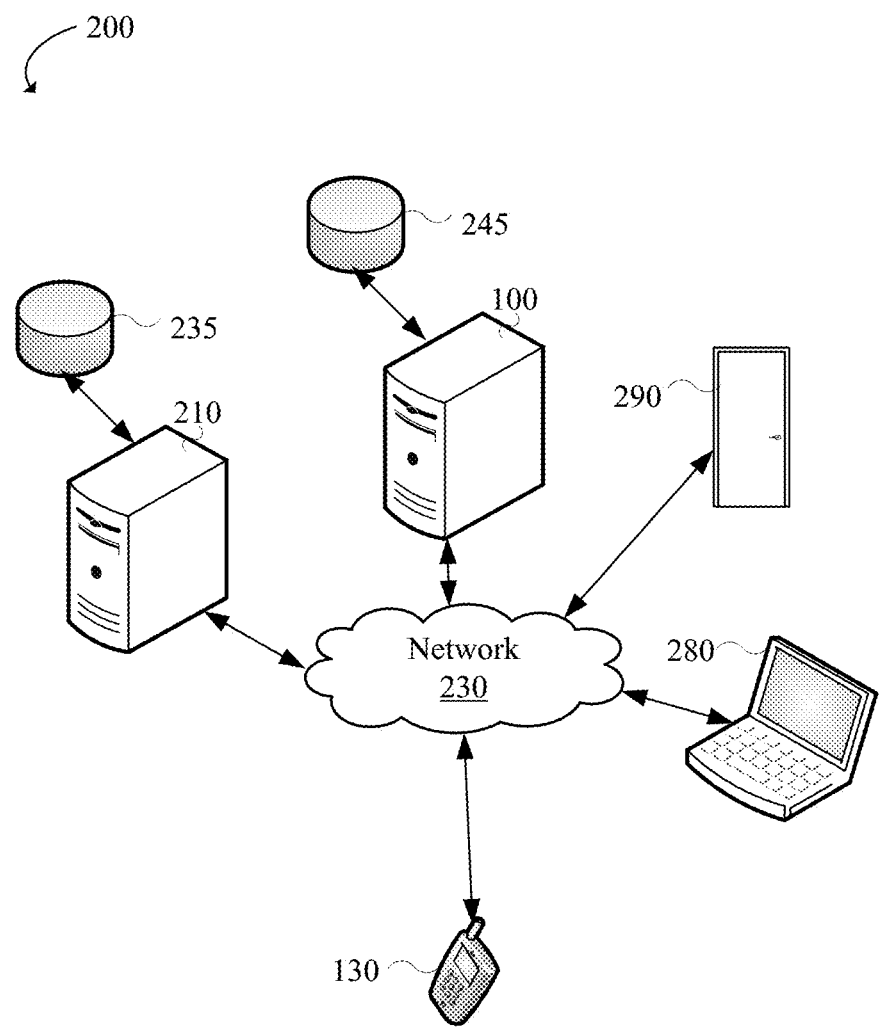
FIG. 2 is a schematic operation diagram illustrating an operating environment.

FIG. 2 is a schematic operation diagram illustrating an operating environment of an example embodiment. FIG. 2 illustrates a system 200 which may be or include an ambient commerce system 100. The ambient commerce system 100 may be of the type described above with reference to FIG. 1, or a variation thereof. The ambient commerce system 100 may be or include a computer system. The computer system may be coupled with one or more sensors, as described with reference to FIG. 1 and may receive sensor output from such sensors.

The system 200 may also include an electronic device 130. The electronic device 130 may be as described above with reference to FIG. 1. For example, the electronic device 130 may be associated with an entity, such as a customer. The electronic device 130 may also be a computer system.

The electronic device 130 may be in communication with the ambient commerce system 100. Such communication may be via a direct connection or it may be an indirect connection. An indirect connection may be a connection that relies upon other intermediary computers or systems to relay messages. For example, as illustrated in FIG. 2, the ambient commerce system 100 and the electronic device 130 may be coupled to and communicate with one another via a network 230. The network 230 may be of various types. The network 230 may be a computer network. In some embodiments, the computer network may be an internetwork and may be formed of one or more interconnected computer networks. For example, the computer network may be or may include an Ethernet network, an asynchronous transfer mode (ATM) network, a wireless network, a telecommunications network or the like.

In some implementations, at least some communications between the electronic device 130 and the ambient commerce system 100 may occur over a direct connection. A direct connection may be a local communication method which may not require a network. For example, example direct connections include NFC, WiFi, and Bluetooth.

The system 200 may be or include one or more independent trusted systems 210. The independent trusted system may be a resource server, for example. A resource server may track, manage, and maintain resources, adjudicate lending requests, and/or lend resources for a plurality of entities. For example, resources available for a plurality of entities may be specified in account data for such entities. The resources may, for example, include computing resources, such as memory or processor cycles. By way of further example, the resources may include stored value, such as fiat currency, which may be represented in one or more databases. For example, as shown in FIG. 2, the independent trusted systems 210 may be coupled to a database 235, which may be provided in secure storage. The secure storage may be provided internally within the independent trusted systems 210 or externally; the secure storage may, for example, be provided remotely from the independent trusted systems 210. In some embodiments, the secure storage may include one or more data centers. The data centers may, for example, store data with bank-grade security.

The independent trusted systems 210 may include a resource request processing engine (not shown in FIG. 1). A resource request processing engine may be implemented to automatically process resource transfer requests that are received at an independent trusted systems 210. Specifically, the resource request processing engine may be configured to process requests to transfer resources that are associated with one or more resource accounts managed by the independent trusted systems 210. The resource request processing engine may process resource transfer requests in accordance with defined handling actions. For example, the resource request processing engine may be configured to automatically process resource transfer requests without manual intervention by related entities for the resource transfer requests. The independent trusted systems 210 may include an ambient commerce interface engine that may be configured to interface with an ambient commerce system.

The database 235 includes account data for a plurality of accounts associated with a plurality of entities. For example, the database 235 may include records for a plurality of accounts and at least some of the records may define a quantity of resources associated with an entity. For example, the entity that is associated with the electronic device 130 (which may also be referred to as a client device or customer device) may be associated with a resource account having one or more records in the database 235. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance. In some implementations, a record for an account may be or include a resource parameter or enable the determination of a resource parameter. A resource parameter may, for example, indicate whether a particular entity associated with an account has access to a resource. In some implementations, the resource parameter may specify whether the particular entity associated with the account has access to a borrowed resource. In some implementations, the resource parameter may indicate a resource balance. The balance may be a balance associated with owned or borrowed resources.

The database 235 may also include identity verification data for entities having accounts in the database 235. The identity verification data may be or include a shared secret and/or biometric data such as a fingerprint, voiceprint and/or facial profile data. In some implementations, the identity verification data may be or include a transaction listing or other historical information such as, for example, behavioural data. In at least some implementations, the independent trusted systems 210 may share at least some of the identity verification data with the ambient commerce system 100 to assist with verifying identity of an entity at an ambient commerce premises 110. In other implementations, rather than share the identity verification data itself, the independent trusted systems 210 may, instead, perform identity verification for the ambient commerce system and may confirm to the ambient commerce system the identity of an entity.

The database 235 may also include profiles for a plurality of entities. A profile may also be referred to as profile data and such data may be part of the account data, for example. A profile may be or include biographical data associated with an entity. By way of example, the profile may be or include an age identifier for the entity, such as an age or date of birth. By way of further example, the profile may be or include other information about the entity such as residential information (including, for example, a city of residence, country of residence, etc.), income information (such as an annual income), past spending or shopping information, or information about products associated with the entity (such as whether the entity has a particular credit card or information about whether the entity is a subscriber to a particular service, or information about whether is a member of a particular loyalty program).

The independent trusted systems 210 may, for example, be a financial institution system and the entity associated with an electronic device 130 may be a customer of a financial institution operating the financial institution system.

The independent trusted systems 210 may be or include a computer system. The independent trusted systems 210 may be in communication with the ambient commerce system 100. In the illustrated example, the independent trusted systems 210 is in communication with the ambient commerce system 100 via the network 230. The independent trusted systems 210 may also communicate with one or more electronic devices 130 via the network 230.

As illustrated in FIG. 2, the ambient commerce system 100 may also include or be connected to a datastore 245 such as a database. The datastore 245 may be or include an inventory tracking data store. In some implementations, the datastore 245 may include product data for one or more items that are physically present in the ambient commerce premises 110. By way of example, the datastore 245 may include one or more parameters associated with items available at the ambient commerce premises 110. Such parameters may be referred to as item parameters. Example item parameters may be or include a value parameter and/or a class parameter. A value parameter may be an indicator of a cost or price of an item. Put differently, the value parameter for an item may represent an amount of resources required to transfer ownership of the item to an entity. The value parameter may, in some implementations, be expressed in units of currency, such as in dollars, Euros, Francs, etc.

A class parameter may define a category or classification that an item belongs to and it may also be referred to as a category parameter. The category may represent a type of the item. By way of example, example categories may include any one or a combination of: consumer electronics, televisions, sporting goods, bicycles, financeable products, clothing, grocery items, etc.

In some instances, a particular item may be associated with multiple class parameters. By way of example, an item may be associated with a broad class parameter that defines a broad category of the item (e.g., consumer electronic) and a narrow class parameter that defines a narrow category of the item (e.g., television). In some implementations, the class parameter(s) for an item may be or include a binary class parameter. A binary class parameter is a class parameter that operates as a flag which defines whether the item is or is not a particular type of good associated with that class parameter. By way of example, a binary class parameter may indicate whether an item is financeable. In some implementations, a financeable item may be an item that is available for purchase using a buy now pay later feature.

The class parameter(s) for an item may also be or include a brand parameter. A brand parameter indicates a brand associated with the item. The brand may be a manufacturer of the item. The brand may be a brand that is reflected on packaging associated with the item.

The product data in the datastore 245 may include restriction data. The restriction data identifies at least one product whose purchase is restricted. That is, it may identify items that are restricted items. The restriction data, in some implementations, includes binary restriction data. Binary restriction data operates as a flag which defines whether the item is or is not restricted. The restriction data may also be or include non-binary restriction data. The non-binary restriction data may, for example, define a nature of a restriction. By way of example, in some implementations, a particular item may be an age-restricted item. In such implementations, the restriction data may specify a requisite age for the item. The requisite age may be a legal minimum age required for purchase of the product in a jurisdiction associated with the ambient commerce system 100. In other implementations, an item may be restricted on another basis. By way of example, it may be that the item is only available for purchase if a customer resides in a certain jurisdiction. By way of example, some products may not be available to purchase for out-of-jurisdiction purchasers. By way of further example, some products may only be available for purchase through a promotion, and it may be that a customer needs to have a particular credit card or loyalty program or other service or subscription in order to purchase the item. Restriction data may define any one or more restrictions of the type defined above or elsewhere in this document.

The datastore 245 or another datastore may also include item identification data. The item identification data may be data that is used by the ambient commerce system to identify an item in the ambient commerce premises. By way of example, in a system that relies upon a code such as a barcode or QR code for identification of items, the item identification data may include a representation of the code for a particular item. By way of further example, in a system which relies upon packaging identification, the item identification data may include information about the packaging of an item. By way of further example, in a system that relies upon in-store placement information to identify items, the item identification data may include information defining a location within the ambient commerce premises at which a particular item is located. By way of example, the in-store placement information may specify an aisle number, region number, shelf number, etc. and such numbers (or other identifiers) may be known to the ambient commerce system so that the ambient commerce system is able to identify the particular items available at various regions of the ambient commerce premises.

By way of further example, in a system which relies upon a tag such as an RFID tag, the item identification data may specify a number or other identifier associated with the tag.

The ambient commerce system 100 may also include or be connected to an electronic device 280 associated with an in-store operator. The in-store operator may be an employee of a merchant operating the ambient commerce premises, for example. The electronic device 280 associated with the in-store operator may be of a type that is the same or similar to the electronic device 130 associated with the entity. By way of example, the electronic device 280 may be a laptop or desktop computer, a mobile computing device such as a smartphone, a smart watch or other wearable or an electronic device of another type. The electronic device 280 associated with the in-store operator may communicate with the ambient commerce system 100 by way of a network 230.

The ambient commerce system 100 may also include or be connected to an electrically controlled exit prevention device 290 such as an electrically controlled gate or door associated with an exit for the ambient commerce premises. The electrically controlled exit prevention device 290 may be controlled to prevent the entity from leaving the ambient commerce premises with a restricted item when the entity has not demonstrated eligibility to purchase the age-restricted item. In some implementations, the electrically controlled exit prevention device 290 may be or include an electrically controlled lock. In some implementations, the electrically controlled exit prevention device 290 may be or include an automatic door which may be controlled to disable opening of the door to prevent exit by an entity.

While a single independent trusted systems 210 is illustrated in FIG. 2, in some implementations there may be multiple independent trusted systems 210. These independent trusted systems 210 may be independent of one another. For example, they may be operated by different entities. Each may be in communication with the ambient commerce system 100.

Figure 3:
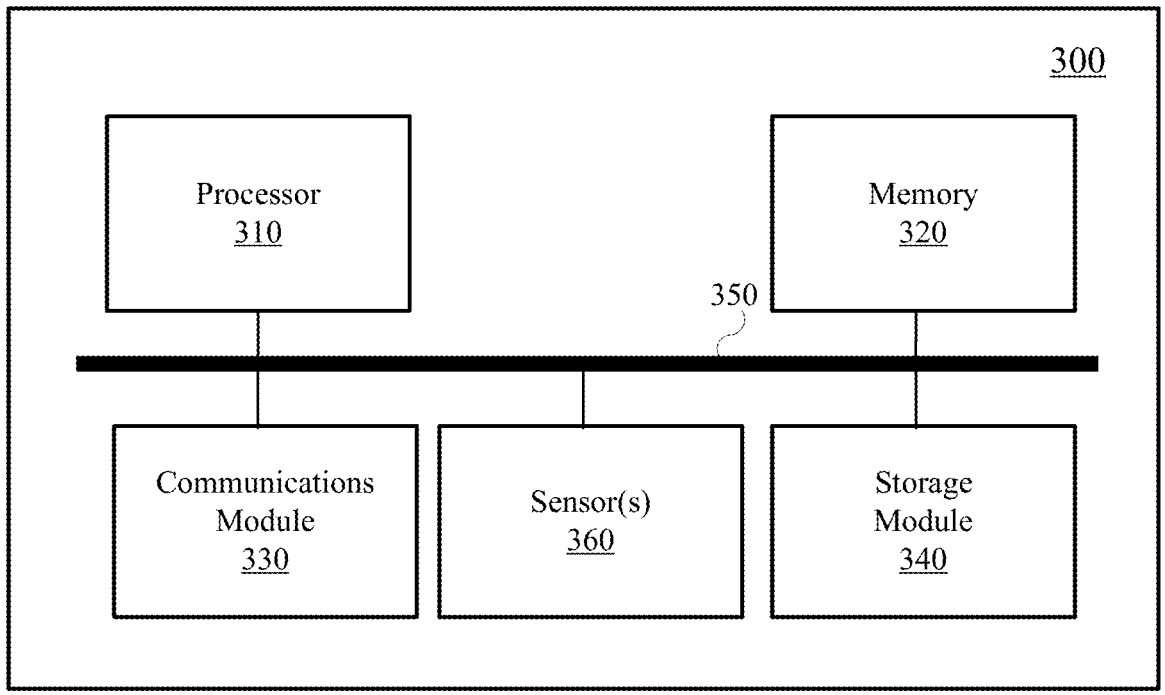
FIG. 3 is a high-level schematic diagram of an example computer device.

Referring now to FIG. 3, a high-level operation diagram of an example computer device 300 is shown. In some embodiments, the computer device 300 may be exemplary of one or more of the ambient commerce system 100, the electronic device 130, the electronic device 280 and/or the independent trusted systems 210.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application. The communications module may, in various implementations, be one or more of: a communications device, a communications interface, a communications chip, and/or a transceiver.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persistent storage other than the persisted storage (if any) accessible via the memory 320. In some embodiments, the storage module 340 may be used to store and retrieve data in a database. A database may be stored in persistent storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access remotely stored data using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

When the computer device 300 is exemplary of the ambient commerce system 100 or, in at least some implementations, the electronic device 130, the computer device may include one or more sensors 360. The one or more sensors 360 may be or include any one or more of the sensors described above with reference to FIG. 1.

Figure 4:
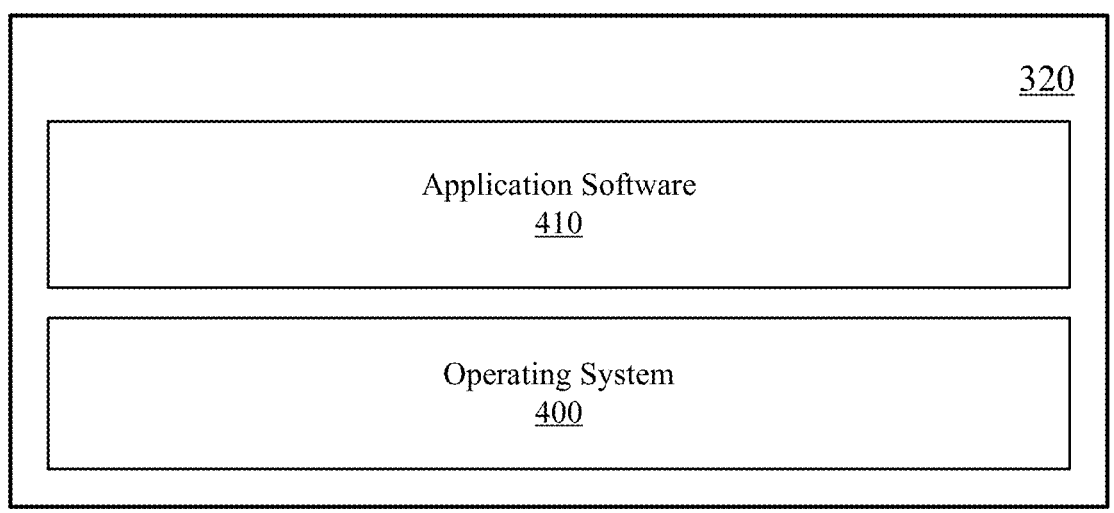
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the ambient commerce system 100, the independent trusted system(s) 210 and/or the electronic device 130.

While a single application 410 is illustrated in FIG. 4, in operation the memory 320 may include more than one application 410 and different applications 410 may perform different operations.

Figure 5:
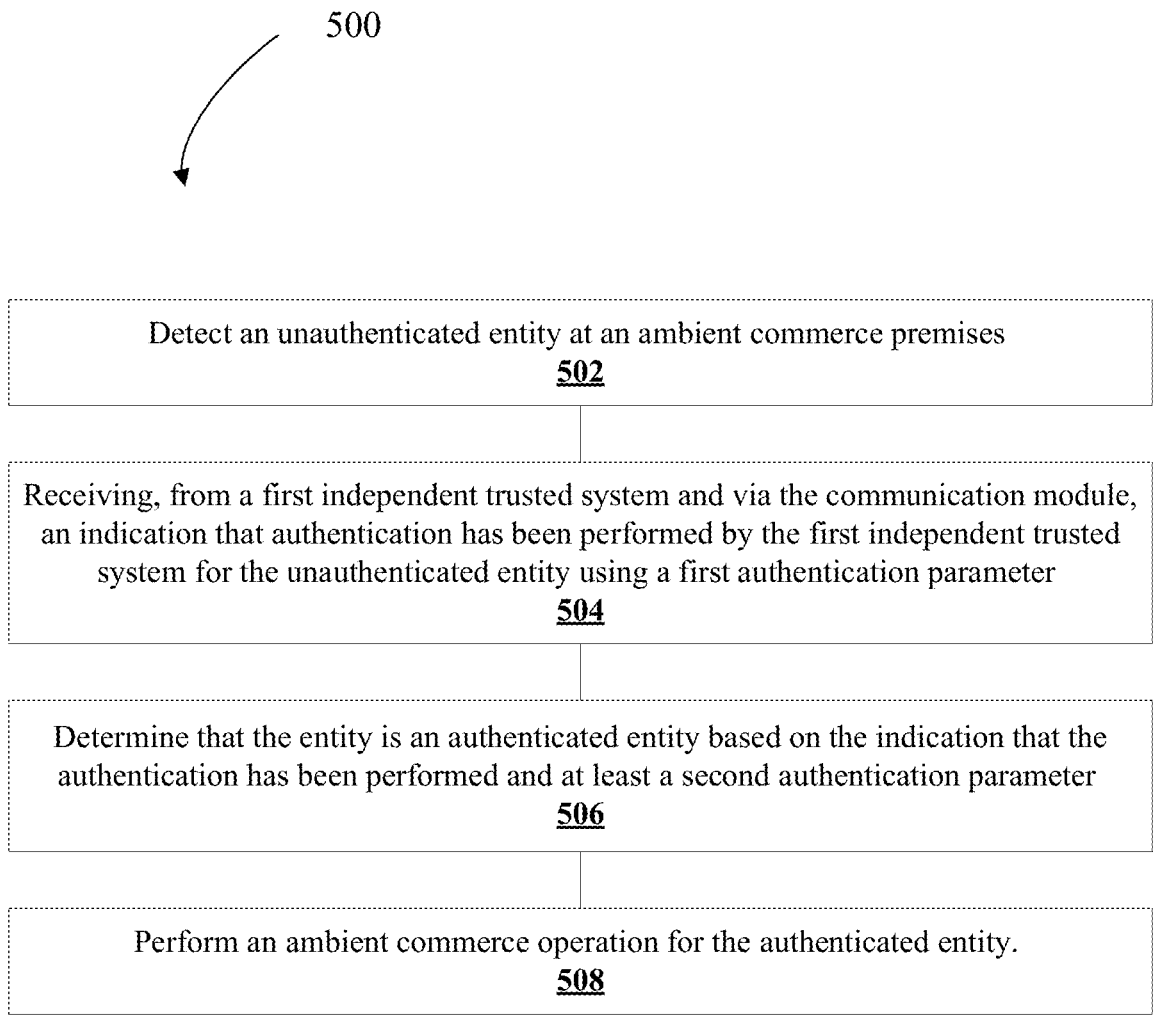
FIG. 5 is a flowchart showing operations performed by an ambient commerce system.

FIG. 5 is a flowchart showing operations performed by a system 200, such as the ambient commerce system 100 (FIGS. 1 and 2) and/or the independent trusted systems 210 (FIG. 2). The operations may be included in a method 500 which may be performed by the ambient commerce system 100 (FIGS. 1 and 2) and/or the independent trusted systems 210 (FIG. 2). For example, computer-executable instructions stored in memory of the ambient commerce system 100 (FIGS. 1 and 2) and/or the independent trusted systems 210 (FIG. 2) may, when executed by one or more processors of the ambient commerce system 100 (FIGS. 1 and 2) and/or the independent trusted systems 210 (FIG. 2), configure the ambient commerce system 100 (FIGS. 1 and 2) and/or the independent trusted systems 210 (FIG. 2) to perform the method 500 or a portion thereof.

At operation 502, the method 500 includes, detecting, based on an output of one or more of sensors at an ambient commerce premises, an unauthenticated entity. That is, the ambient commerce system 100 may determine that an entity is on site who has not yet been authenticated, so as to become an authenticated entity. Put differently, the ambient commerce system 100 may determine that an entity is on site at the ambient commerce premises who has not yet been positively identified.

The ambient commerce system 100 may detect the unidentified entity based on, for example, a sensor output from a sensor of a type described above. By way of example, in one implementation, the sensor may be or include a camera. The ambient commerce system 100 may identify a customer who has just entered the ambient commerce premises at the operation 502. That is, the ambient commerce system 100 may identify new customers as they enter the ambient commerce premises. In some implementations, the sensor that is used for the operation 502 is an entry sensor. The entry sensor may be a sensor that is activated upon entry of an entity to the ambient commerce premises. Entry sensors may include one or more of the following: a door-facing camera, a sensor coupled to a turnstile and/or a beacon or reader at or near an entry point.

In at least some implementations, after the ambient commerce system 100 detects an unidentified and/or unauthenticated entity at the ambient commerce premises, it may perform one or more operations to identify and/or authenticate the entity.

For example, the ambient commerce system 100 may communicate with one or more independent trusted systems in order to authenticate the entity. For example, the ambient commerce system 100 may communicate with the independent trusted system(s) via the communication module. In some implementations, at an operation 504, the ambient commerce system 100 may receive, from a first independent trusted system and via the communication module, an indication that authentication has been performed by the first independent trusted system for the unauthenticated entity using a first authentication parameter.

The independent trusted systems may be separate and remote from the ambient commerce system. For example, in one implementation, a first independent trusted system may be a financial institution system. The financial institution system may be operated by a financial institution such as a bank. In some implementations, the first independent trusted system may be a card processing system, such as a credit card processing system. The ambient commerce system 100 may be operated by an entity that is different than the entity that operates the financial institution system. In at least some implementations, the configuration of the first independent trusted system may be blind to the ambient commerce system. That is, the ambient commerce system may be configured without detailed knowledge of operation of the first independent trusted system.

In at least some implementations, an independent trusted system may monitor to determine when a particular entity that is associated with that independent trusted system is on-site at the ambient commerce premises. For example, the particular entity may be a customer, client or subscriber for the independent trusted system. By way of example, where the independent trusted system is a financial institution system, it may be that the particular entity is a customer of that financial institution system. For example, the particular entity may have an account with the independent trusted system.

The independent trusted system may have an associated application stored in memory of an electronic device 130 associated with a customer. By way of example, where the independent trusted system is a financial institution system, the associated application may be a financial application such as a banking application or, more particularly, a mobile banking application. The associated application may, in at least some implementations, track a location of the electronic device 130 and it may report the location to the independent trusted system. The location may be a GPS location or it may be a cellular triangulation location or a location determined using another technique.

In at least some implementations, the independent trusted system may recognize that the electronic device 130 has entered into a geofence associated with the ambient commerce premise and it may then initiate communications with the ambient commerce system. For example, when the electronic device 130 enters the geofence, the first independent trusted system may recognize that it has entered the geofence and it may then communicate with the ambient commerce system. In order to initiate such communications, the independent trusted system may consult a location mapping database which maps geographic data to associated ambient commerce systems. By way of example, the mapping may include geographic coordinates or other geographic identifiers that map a location of a geofence. The mapping may, additionally or alternatively, include a unique identifier of the ambient commerce system. The unique identifier may be or include an address, such as an IP address, web address, MAC address, etc. The identifier may be used to allow the independent commerce system to identify the specific server that it is to communicate with based on the geographic location of the electronic device. For example, when the electronic device is within a first geofence, the mapping may indicate an address of a first ambient commerce system while, when the electronic device is in a second geofence, different from the first geofence, the mapping may indicate an address of a second ambient commerce system. The location mapping database may, in some implementations, be a private database accessible to only a particular system and, in other implementations, it may be a public database or a semi-private database which may be accessible to all systems (in the case of a public database) or to certain trusted databases (in the case of a semi-private database).

When a first independent trusted system performs some identification or authentication to aid the ambient commerce system in identifying or authenticating an entity, it provides, at the operation 504, an indication that authentication has been performed by the first independent trusted system for the authenticated entity using a first authentication parameter.

An authentication parameter, as used herein, includes any data that may be used to authenticate an entity as being on site at an ambient commerce premises. By way of example, an authentication parameter may be or include a facial profile, a fingerprint, a voiceprint, a credential, a location and/or a behavioral indication.

As noted above, the first independent trusted system may determine that the entity is on site at an ambient commerce premises based on location. For example, as noted above, the first independent trusted system may determine that the entity's electronic device is at the ambient commerce premises and it may use the location of the electronic device as a proxy for a location of the entity.

In at least some implementations, the first independent trusted system may use another authentication parameter instead of or in addition to the location. By way of example, a biometric parameter such as a facial profile, fingerprint or voiceprint may be used to authenticate the entity. For example, the first independent trusted system may authenticate the entity using a stored facial profile, fingerprint or voiceprint. In at least some implementations, the first independent trusted system may authenticate the entity using the biometric authentication parameter when it has first determined that the electronic device is at an ambient commerce premises associated with the ambient commerce system. For example, it may be that the first independent trusted system determines, based on a location of an electronic device associated with a particular entity, that the particular entity is on site at the ambient commerce premises and it may then use the facial profile, fingerprint or voiceprint to further verify that the particular entity is on site at the ambient commerce premises. In some implementations, the voiceprint, fingerprint or facial profile may be compared with a biometric input at a sensor of the electronic device 130. In other implementations, the verification may be performed using a sensor output of a sensor included in the ambient commerce system itself. For example, in one implementation, after communications have been established between the ambient commerce system and the trusted independent system, the trusted independent system may send sensor data to the first independent trusted system for further authentication. The first independent trusted system may use such data to perform authentication (e.g., to determine that the sensor data and the biometric data match) and it may then send the ambient commerce system an indication that authentication has been performed based on a biometric authentication parameter.

In some implementations, a credential such as a password or a PIN or other credential may be used instead of or in addition to a biometric. For example, the trusted independent system may perform authentication based on the credential. In some implementations, the PIN or password may be input through the electronic device 130 to verify that the electronic device that appears to be at the ambient commerce premises is in use by the particular entity. In another implementation, the PIN or password may be input at an input device at the ambient commerce premises to verify that the particular entity is, in fact, at the ambient commerce premises.

A behavioural indication may in some implementations function as an authentication parameter that may be used for authentication. A behavioural indication may be or include historical data such as a transaction listing identifying past transactions involving a particular entity and/or past locations at which the particular entity has visited or merchants associated with such locations. The behavioural indication may, in this way reflect past or typical behaviour of a customer. The behavioral indication may also be referred to as a behavioural profile. The behavioural indication may indicate a list of merchants that a particular entity has visited and/or categories of such merchants. In at least some implementations, the behavioural indication may be used to authenticate an entity as being at an ambient commerce premises by determining whether the ambient commerce premises is of a type that the particular entity may be expected to be at based on the behavioural profile for that particular entity.

As noted above, in some implementations, the first independent trusted system may perform authentication based on one or more of a facial profile, a fingerprint, a voiceprint, a credential and/or a behavioural indication associated with a particular entity. The facial profile, fingerprint, voiceprint, credential and/or behavioural indication may be stored in memory associated with the first independent trusted system.

In some implementations, the first independent trusted system may store the facial profile, fingerprint, voiceprint, credential and/or behavioural indication and it may provide the facial profile, fingerprint, voiceprint, credential and/or behavioural indication to the ambient commerce system to allow the ambient commerce system to use the facial profile, fingerprint, voiceprint, credential and/or behavioural indication to perform authentication. For example, the indication that is sent from the first independent trusted system to the ambient commerce system may include stored profile data such as a facial profile, fingerprint, voiceprint, credential and/or behavioural indication. Such data may then be used by the ambient commerce system to perform authentication. For example, the ambient commerce system may compare such data to a sensor output and/or to a signal received at an input device. In this way, the ambient commerce system may perform authentication for entities with whom it does not have a prior relationship with. That is, even if a customer has not created an account with the ambient commerce system it may be able to, nevertheless, shop at an ambient commerce premises associated with that ambient commerce system. Conveniently, this may allow the ambient commerce system to operate with new shoppers without having to onboard the customer through a complicated registration process. Rather, the ambient commerce system may largely rely upon a first independent trusted system that has already onboarded the customer.

As noted above, in at least some implementations, the indication that is received at the operation 504 may indicate that a particular entity has been identified as being at the ambient commerce premises. Additionally or alternatively, in some implementations, the indication may indicate that authentication has been performed using one or more of: a facial profile, a fingerprint, a voiceprint, a credential and/or a behavioural indication. Additionally or alternatively, in some implementations the indication may include the facial profile, fingerprint, voiceprint, credential and/or behavioural indication.

In at least some implementations, the indication that is sent from an independent trusted system to the ambient commerce system may be formatted to uniquely identify the independent trusted system as the source of the indication. For example, the indication may be formatted to uniquely identify the independent trusted system using a private key associated with that trusted system. In at least some such implementations, the ambient commerce system may decrypt the indication with a public key associated with the private key in order to verify the identity of that independent trusted system.

After the ambient commerce system has received the indication, at an operation 506, it may determine that the entity is an authenticated entity based on the indication that the authentication has been performed and at least a second authentication parameter. The second authentication parameter may be an authentication parameter that is determined based on a sensor output of a sensor associated with the ambient commerce system. For example, as noted above, the independent trusted system may include stored profile data in the indication and, at the operation 506, the ambient commerce system may use such stored profile data in order to authenticate the entity. For example, the stored profile data received in the indication may be compared to sensor output to determine an entity represented by the stored profile data has been detected at the sensor. That is, determining that the unauthenticated entity is an authenticated entity based on the indication that the authentication has been performed and at least a second authentication parameter may include comparing data obtained from the sensor to the stored profile data.

In at least some implementations, when a particular entity is determined to be at the ambient commerce premises based on the first authentication parameter and also based on the second authentication parameter, then the particular entity may be determined to have been authenticated. That is, the unauthenticated entity may become an authenticated entity when authentication is performed based on the first and second authentication parameters. As described above, at least one of the first and second authentication parameters may be evaluated at an independent trusted system.

After the entity has been authenticated as being at the ambient commerce premises, the ambient commerce system may perform an ambient commerce operation for the authenticated entity. The ambient commerce operation may be performed in a variety of manners. The ambient commerce operation may, in some implementations, be or include an ambient commerce checkout operation. That is, the ambient commerce operation may include processing an ambient commerce transaction or transfer. The ambient commerce operation or transfer may be processed in response to detecting, using a sensor, an intent to complete a transaction. The intent to complete the transaction may be detected, for example, when the entity is determined to have exited the ambient commerce premises. By way of example, the ambient commerce system may determine that the entity has exited the ambient commerce premises when the entity is no longer reflected on any cameras associated with the ambient commerce system. In some implementations, one of the sensors may be an exit sensor. The exit sensor may be a sensor that is activated when the entity exits the ambient commerce premises. That is, the exit sensor monitors a place of exit to detect an entity leaving through the exit. Exit sensors may include one or more of the following: a door-facing camera, a sensor coupled to a turnstile and/or a beacon or reader at or near an exit point. Accordingly, the intent to complete may be detected using a sensor such as an exit sensor.

The intent to complete the transaction may be identified in other ways. For example, in some implementations, an input device on the entity's electronic device 130 or at the ambient commerce premises may be used by the entity to indicate that they are done shopping and ready to complete a payment. By way of example, it may be that an input device is provided on a shopping receptacle 170. The input device may be of a variety of types including, for example, a button.

In some implementations, an intent to complete the transaction may be identified by identifying a gesture performed by the entity. The gesture may be detected using a sensor at the ambient commerce premises such as a camera. By way of example, a gesture may involve a nod. For example, it may be that there is signage disposed at the ambient commerce premises instructing entities to perform a particular gesture to complete a transaction. For example, the sign may instruct customers to nod when in a specific location of the ambient commerce premises to complete the purchase. Accordingly, the intent to complete the transaction may be identified when a gesture is determined to have been performed at a particular location in the ambient commerce premises. For example, the sign may say "Do you want to complete your transaction? Nod to confirm" and the intent to complete the transaction may be detected when it is determined based on sensor output that the entity has nodded when facing the sign.

When the ambient commerce system detects an intent to complete the transaction, the ambient commerce system 100 may process a transfer. The ambient commerce system may determine an amount of the transaction (which may also be referred to herein as a transfer) based on data from the sensors. For example, the amount of the transaction is based on which items have been identified as being associated with the transaction. Such identification does not require that the customer scan a barcode at a checkout system that may be operated by a cashier or the entity itself. That is, cashier or self-checkout need not be performed. Rather, the identification of the items involved in the transaction is performed passively using the sensors such as the receptacle contents detectors 146. After the ambient commerce system identifies the items passively, it may process the transaction. The transaction is processed based on the identity of the entity. That is, the transaction is processed for the particular entity that has been authenticated and that is purchasing the goods.

In at least some implementations, the transaction may be processed through the first trusted independent system. For example, the ambient commerce system may send the first trusted independent system a transaction request. The transaction request may identify the entity associated with the request. In some implementations, the transaction request may include an identifier that was provided to the ambient commerce system from the first independent trusted system in the indication at the operation 504. In this way, the first trusted independent system may map the transaction request to the particular entity that was identified and/or authenticated by the first trusted independent system as being at the ambient commerce premises and/or as using an electronic device 130 that travelled within a geofence associated with the ambient commerce premises. The transaction request specifies an amount of the transaction and the amount is based on the items that the ambient commerce system has passively determined are to be included in the transaction. If the transaction is successfully completed, the first trusted independent system may send a completion message to the ambient commerce system and, if it fails, the first trusted independent system may send a failure message to the ambient commerce system. A failure may occur, for example, when the identified entity has insufficient resources associated with their account to complete the transaction. For example, a balance or available credit may be too low to complete the transaction.

In at least some implementations, when the transaction is completed successfully, the ambient commerce system 100 may control an electrically controlled exit prevention device 290, such as an electrically controlled gate or door associated with an exit for the ambient commerce premises, to allow the entity to leave the ambient commerce premises. If, however, the transaction is not completed or if the entity was not authenticated prior to detecting the intention to complete the transaction, then an operation may be performed to prevent the entity from leaving the premises. For example, the electrically controlled exit prevention device 290 may be controlled to prevent the entity from leaving the ambient commerce premises.

In some implementations, the electrically controlled exit prevention device 290 may be or include an electrically controlled lock. In some implementations, the electrically controlled exit prevention device 290 may be or include an automatic door which may be controlled to selectively disable or enable opening of the door to prevent exit by an entity.

Accordingly, in at least some implementations, the operation 508 may include controlling an electrically controlled exit prevention device 290.

Other operations may be performed when an entity who has indicated an intention to complete a transaction is not identified or when the transaction fails. For example, it may be that a notification may be generated on an electronic device 280 associated with an in-store operator. The notification may, for example, indicate that the entity has not been identified and/or that the transaction did not complete. Additionally or alternatively, a notification may be generated on an electronic device 130 associated with the entity to inform the entity that authentication or transaction processing was unsuccessful. An appropriate notification may also be generated on an in-store operator electronic device 280 or an entity's electronic device 130 when a transaction successfully completes. Such a notification may inform the entity that the transaction has been completed.

Other operations may be performed based on the authentication at the operation 506. For example, at the operation 508, the ambient commerce system may perform an ambient commerce operation that facilitates control of a restricted item. By way of example, an electrically controlled exit prevention device 290 may be controlled based on whether the entity satisfies certain restrictions associated with the restricted item and/or a notification may be generated on an in-store operator electronic device 280 or an entity's electronic device 130 based on whether the entity satisfies certain restrictions. In at least some implementations, the indication that is provided at the operation 504 to the ambient commerce system may include profile data. The profile data may include biographical data associated with the entity such as an age identifier for the entity. The ambient commerce system may determine whether the entity complies with the restriction associated with an item based on the profile data. In some implementations, the indication provided at the operation 504 to the ambient commerce system may include an indication of whether the entity is eligible to purchase restricted items. For example, the indication may indicate whether the entity is sufficiently old to make the purchase. In some implementations, the indication may indicate whether the entity is sufficiently old to make the purchase of the restricted item without indicating the age of the entity. The ambient commerce system may then use this indication to selectively prevent or allow ambient purchase of a restricted item.

Conveniently, the techniques described above may allow for simplified ambient commerce systems. Such systems may be deployed at stores and may even allow a customer who has not pre-registered with a particular ambient commerce system to complete an ambient commerce session. This may allow ambient commerce systems to be deployed at small retailers. In some implementations, the ambient commerce system may not even know the true identity of the customer, which may help to protect the customer's privacy.

In some implementations, communications between the first independent trusted system and the ambient commerce system may be arranged to prevent a processing lag which could either delay an entity being able to exit the ambient commerce premises or result in a transaction failing to complete after an entity has already left the ambient commerce premises. For example, in one implementation, the first trusted independent system may send a maximum transaction value amount to the ambient commerce system. The maximum transaction value amount may be or represent a maximum amount that can be processed for the identified entity. The maximum transaction amount may be or represent the total amount of funds available to the entity. In at least some implementations, the first trusted independent system may place a hold or pre-authorization on an amount of funds equal to the maximum transaction amount. The amount may be held for an amount of time sufficient to complete the transaction. In this way, the transaction may be effectively guaranteed by the first trusted independent system as long as it is for an amount that is less than or equal to the maximum transaction amount. The ambient commerce system may allow an entity to leave the ambient commerce premises with items having a value that is less than or equal to the maximum transaction amount even if a transaction has not yet been completed. If, however, the entity adds items to a shopping receptacle such that the maximum transaction amount is exceeded, an operation may be performed by the ambient commerce system to prevent that entity from leaving the ambient commerce premises with the items. For example, a notification may be generated on an in-store operator electronic device 280 or an entity's electronic device 130 and/or an electrically controlled exit prevention device 290 may be controlled to prevent the entity from leaving.

Figure 6:
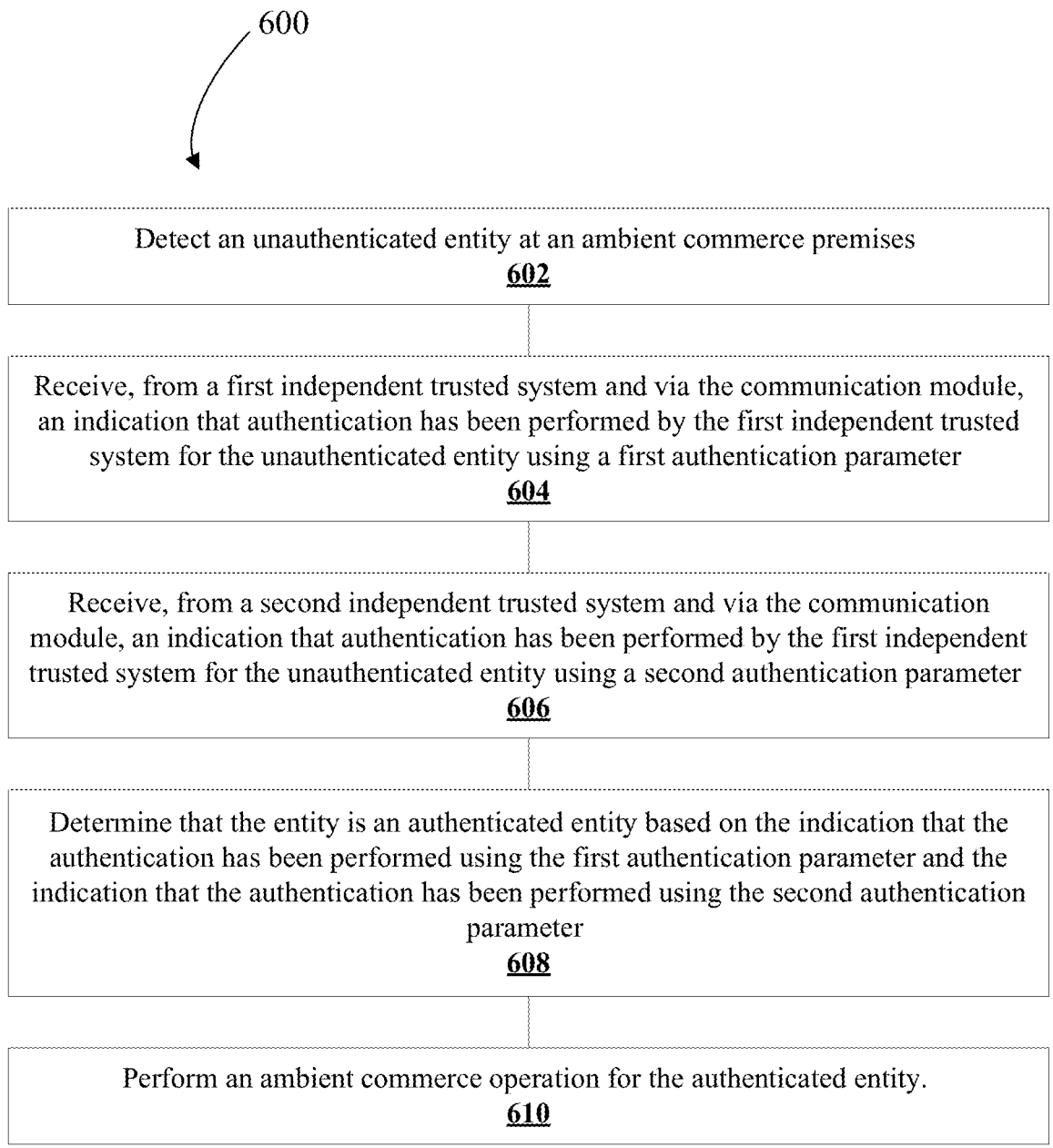
FIG. 6 is a flowchart showing operations performed by an ambient commerce system.

Variations of the methods and systems described above are contemplated. For example, reference is now made to FIG. 6 which illustrates a flowchart showing operations performed by a system 200, such as the ambient commerce system 100 (FIGS. 1 and 2) and/or the independent trusted systems 210 (FIG. 2). The operations may be included in a method 600 which may be performed by the ambient commerce system 100 (FIGS. 1 and 2) and/or the independent trusted systems 210 (FIG. 2). For example, computer-executable instructions stored in memory of the ambient commerce system 100 (FIGS. 1 and 2) and/or the independent trusted systems 210 (FIG. 2) may, when executed by one or more processors of the ambient commerce system 100 (FIGS. 1 and 2) and/or the independent trusted systems 210 (FIG. 2), configure the ambient commerce system 100 (FIGS. 1 and 2) and/or the independent trusted systems 210 (FIG. 2) to perform the method 600 or a portion thereof.

The method 600 may include one or more operations described above with reference to the method 500 and such operations will not be repeated at length.

At an operation 602, the ambient commerce system may detect an unauthenticated entity at an ambient commerce premises. The operation 602 may be performed in a manner that is the same or similar to the operation 502 of the method 500 of FIG. 5.

Next, at an operation 604, the ambient commerce system may receive an indication that authentication has been performed by a first independent trusted system for an unauthenticated entity using a first authentication parameter. The operation 604 may be performed in a manner that is the same or similar to the operation 504 of the method 500 of FIG. 5.

The ambient commerce system may, at an operation 606, receive, from a second independent trusted system and via the communication module, an indication that authentication has been performed for the unauthenticated entity by the second independent trusted system using a second authentication parameter. The operation 606 may be performed similar to the operation 604, except that the independent trusted system that provides the indication at the operation 606 is different than the independent trusted system that provided the indication at the operation 604. In this way, the ambient commerce system may rely upon multiple independent trusted systems. By way of example, it could be that the second independent trusted system is associated with a vehicle that is used by an entity and the second independent trusted system may, for example, report to the ambient commerce system that the entity is at the ambient commerce premises when the vehicle is located proximate the ambient commerce premises. It is contemplated that the independent trusted system may be of another type.

In some implementations, both the first and second independent trusted systems may be separate and remote from the ambient commerce system.

Next, an operation 608 may be performed. At the operation 608, the ambient commerce system 100 determines that the entity is an authenticated entity based on the indication that the authentication has been performed based on a first authentication parameter which is received at the operation 604 and also based on the indication that the authentication has been performed based on a second authentication parameter which is received at the operation 606.

One or both of the first and second authentication parameters may be selected from the list that includes: a facial profile, a voiceprint, a fingerprint, a credential, a location, and a behavioural indication.

In at least some implementations, the ambient commerce system may receive indications that authentication has been performed from more than two trusted independent systems.

In at least some implementations, at the operation 608, the ambient commerce system may determine that the unauthenticated entity is an authenticated entity by determining that the authentication has been performed based on at least a threshold of authentication parameters. For example, the ambient commerce system may be configured to determine that the entity has successfully authenticated when authentication has been performed using a sufficient number of authentication parameters. The sufficient number may be defined using a threshold. For example, in one implementation, any two or more of a greater number of possible authentication parameters may be deemed to be sufficient to authenticate an entity.

After the entity has been authenticated, an ambient commerce operation may be performed for the authenticated entity at an operation 610. The operation 610 may be the same or similar to the operation 508 of the method 500 of FIG. 5.

Figure 7:
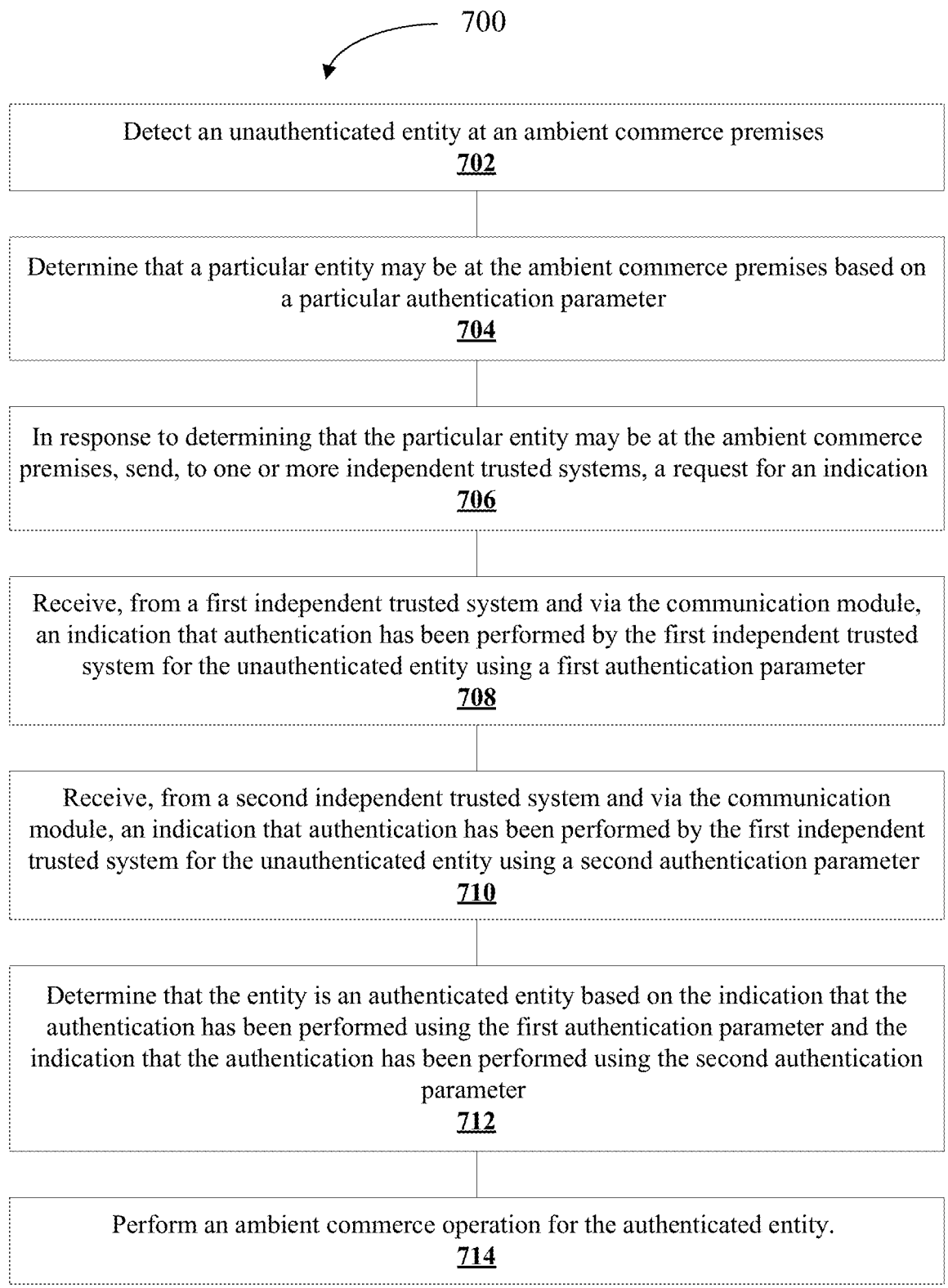
FIG. 7 is a flowchart showing operations performed by an ambient commerce system.

Reference is now made to FIG. 7 which illustrates a flowchart showing operations performed by a system 200, such as the ambient commerce system 100 (FIGS. 1 and 2) and/or the independent trusted systems 210 (FIG. 2). The operations may be included in a method 700 which may be performed by the ambient commerce system 100 (FIGS. 1 and 2) and/or the independent trusted systems 210 (FIG. 2). For example, computer-executable instructions stored in memory of the ambient commerce system 100 (FIGS. 1 and 2) and/or the independent trusted systems 210 (FIG. 2) may, when executed by one or more processors of the ambient commerce system 100 (FIGS. 1 and 2) and/or the independent trusted systems 210 (FIG. 2), configure the ambient commerce system 100 (FIGS. 1 and 2) and/or the independent trusted systems 210 (FIG. 2) to perform the method 700 or a portion thereof.

The method 700 may include one or more operations described above with reference to the method 500 and the method 600 and such operations will not be repeated at length. The method 700 of FIG. 7 is, however, configured to allow the ambient commerce system 100 to pull data from one or more trusted independent systems. That is, rather than rely upon a push protocol in which the trusted independent system initiates communications with the ambient commerce system, the ambient commerce system may initiate a pull of data from one or more of the trusted independent systems. Put differently, the ambient commerce system may trigger authentication to be performed at one or more of the trusted independent systems.

At an operation 702, the ambient commerce system 100 may detect an unauthenticated entity at an ambient commerce premises. The operation 702 may be performed in the manner described above with reference to the operation 502 of the method 500.

Next, at an operation 704, the ambient commerce system 100 may determine that a particular entity may be at the ambient commerce premises. That is, the ambient commerce system 100 may identify an entity that is on-premises based on stored data. That is, it may identify the entity that is on-premises based on an authentication parameter such as a facial profile, a voiceprint, a fingerprint, a credential, a location and a behavioural indication.

When the ambient commerce system 100 determines that a particular entity may be on-site it may send, to one or more trusted independent systems, a request for an indication that the entity has been authenticated as being on-site at the ambient commerce premises. The request may include an identifier that is associated with the particular entity that the ambient commerce system 100 has determined may be on site. For example, the identifier may be a unique identifier of that particular entity at the trusted independent system to which the request is sent. That trusted independent system may receive the request and may then perform operations to determine whether that entity can be authenticated as being at the ambient commerce premises and/or operations to determine whether a particular entity is currently using a particular electronic device. In some implementations, such operations may include determining whether the entity is likely to have visited the ambient commerce premises based on a behavioural pattern associated with that entity. In some implementations, such operations may include determining whether an electronic device associated with the entity is on-site.

In some implementations, the request at the operation 706 may include sensor data obtained from a sensor associated with the ambient commerce premises. The trusted independent system may use the sensor data to determine whether the entity appears to be at the ambient commerce premises.

For example, it may perform facial recognition, voice recognition, fingerprint recognition, etc.

Next, at an operation 708, the ambient commerce system may receive an indication that authentication has been performed by a first independent trusted system for an unauthenticated entity using a first authentication parameter. The operation 708 may be performed in a manner that is the same or similar to the operation 504 of the method 500 of FIG. 5.

The ambient commerce system may, at an operation 710, receive, from a second independent trusted system and via the communication module, an indication that authentication has been performed for the unauthenticated entity by the second independent trusted system using a second authentication parameter. The operation 710 may be performed in a manner that is the same or similar to the operation 606 of the method 600 of FIG. 6.

Then, at an operation 712, the ambient commerce system may determine that the entity is authenticated as described above with reference to the operations 506 of the method 500 and 608 of the method 600.

After the entity has been authenticated, an ambient commerce operation may be performed for the authenticated entity at an operation 714. The operation 714 may be the same or similar to the operation 508 of the method 500 of FIG. 5.

The methods described above may be modified and/or operations of such methods combined to provide other methods. For example, in some implementations, one of the first predetermined criteria and the second predetermined criteria may not be evaluated in some implementations. By way of example, in one implementation, a notification may be sent even if the first item does not satisfy the first predetermined criteria, provided the resource parameter satisfies the second predetermined criteria. By way of further example, in another implementation, a notification may be sent even if the resource parameter does not satisfy the second predetermined criteria as long as the first item satisfies the first predetermined criteria.

Any examples involving a general purpose computer, aspects of this application transform the general-purpose computer into a special-purpose computing device when configured to execute the instructions described herein.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A system comprising:
   one or more sensors positioned at a physical premises for detecting an unauthenticated entity at the physical premises;
   a communication module;
   a processor coupled to the one or more sensors and the communication module; and
   a memory coupled to the processor, the memory storing processor-executable instructions which, when executed, cause the processor to:
   detect, based on an output of at least one of the one or more sensors, the unauthenticated entity at the physical premises;
   receive, from a first independent trusted system and via the communication module, an indication that authentication has been performed by the first independent trusted system for the unauthenticated entity using a first authentication parameter;
   receive, from a second independent trusted system and via the communication module, an indication that authentication has been performed for the unauthenticated entity by the second independent trusted system using a second authentication parameter;
   determine that the entity is now considered an authenticated entity based on the indication that the authentication has been performed by the first independent trusted system for the unauthenticated entity using the first authentication parameter and the indication that authentication has been performed for the unauthenticated entity by the second independent trusted system using the second authentication parameter; and
   perform an operation for the authenticated entity.

2. The system of claim 1, wherein the second independent trusted system is separate and remote from the system.

3. The system of claim 1, wherein determining that the unauthenticated entity is an authenticated entity includes determining that the authentication has been performed based on at least a threshold of authentication parameters.

4. The system of claim 1, wherein the first and second authentication parameters include one or more of:
   a facial profile;
   a voiceprint;
   a fingerprint;
   a credential;
   a location; and
   a behavioural indication.

5. The system of claim 1, wherein the second authentication parameter is determined based on a sensor output of at least one of the one or more sensors.

6. The system of claim 1, wherein the first independent trusted system is a financial institution system.

7. The system of claim 1, wherein the indication includes stored profile data, and wherein determining that the unauthenticated entity is an authenticated entity based on the indication that the authentication has been performed and at least a second authentication parameter includes comparing data obtained from at least one of the one or more sensors to the stored profile data.

8. The system of claim 7, wherein the stored profile data includes one or more of:
   a facial profile;
   a fingerprint;
   a credential;
   a voiceprint; and
   a behavioural indication.

9. The system of claim 1, wherein the indication indicates that a particular entity has been identified as being at the physical premises.

10. The system of claim 1, wherein the instructions further configure the processor to:
- determine that a particular entity may be at the physical premises based on the second authentication parameter; and
- in response to determining that the particular entity may be at the physical premises, send, to the first independent trusted system, a request for the indication.

11. The system of claim 1, wherein the indication is formatted to uniquely identify the first independent trusted system, as a source of the indication.

12. The system of claim 11, wherein the indication is formatted to uniquely identify the first independent trusted system using a private key associated with the first independent trusted system and wherein the instructions further configure the processor to:
- decrypt the indication with a public key associated with the private key.

13. The system of claim 1, wherein the one or more sensors are cameras.

14. A computer-implemented method comprising:
- detecting, based on an output of one or more sensors positioned at a physical premises, an unauthenticated entity at the physical premises;
- receiving, from a first independent trusted system, an indication that authentication has been performed by the first independent trusted system for the unauthenticated entity using a first authentication parameter;
- receiving, from a second independent trusted system, an indication that authentication has been performed for the unauthenticated entity by the second independent trusted system using a second authentication parameter;
- determining that the entity is now considered an authenticated entity based on the indication that the authentication has been performed by the first independent trusted system for the unauthenticated entity using the first authentication parameter and the indication that authentication has been performed for the unauthenticated entity by the second independent trusted system using the second authentication parameter; and
- performing an operation for the authenticated entity.

15. The method of claim 14, wherein the second independent trusted system is separate and remote from a system performing the method.

16. The method of claim 14, wherein determining that the unauthenticated entity is an authenticated entity includes determining that the authentication has been performed based on at least a threshold of authentication parameters.

17. The method of claim 14, wherein the first and second authentication parameters include one or more of:
- a facial profile;
- a voiceprint;
- a fingerprint;
- a credential;
- a location; and
- a behavioural indication.

18. The method of claim 14, wherein the second authentication parameter is determined based on a sensor output of at least one of the one or more of the sensors.

19. The method of claim 14, wherein the first independent trusted system is a financial institution system.

* * * * *